United States Patent [19]
Küpper

[11] Patent Number: 4,506,572
[45] Date of Patent: Mar. 26, 1985

[54] BOBBIN SEPARATING UNIT
[75] Inventor: Wilhelm Küpper, Wegberg, Fed. Rep. of Germany
[73] Assignee: W. Schlafhorst & Co., Monchen-Gladbach, Fed. Rep. of Germany
[21] Appl. No.: 327,037
[22] Filed: Dec. 3, 1981
[30] Foreign Application Priority Data
Dec. 5, 1980 [DE] Fed. Rep. of Germany ....... 3045824
[51] Int. Cl.³ .............................................. B26D 7/06
[52] U.S. Cl. ....................................... 83/112; 83/353; 83/370; 83/404; 83/909
[58] Field of Search ................. 83/112, 353, 370, 371, 83/404, 830, 909; 198/396, 392, 756, 757, 444, 469, 572, 470, 573; 209/927, 666, 660

[56] References Cited
U.S. PATENT DOCUMENTS

| 2,575,015 | 9/1951 | Hendricks | 83/909 |
| 2,582,007 | 1/1952 | Christiansen | 209/666 |
| 2,763,323 | 9/1956 | Lingen | 83/157 |
| 3,295,661 | 1/1967 | Mitchell, Jr. et al. | 198/391 |
| 3,298,564 | 1/1967 | Wheatley et al. | 198/444 |
| 3,530,974 | 9/1970 | Moore | 198/757 |
| 3,682,293 | 8/1972 | Kamp | 198/392 |
| 3,699,833 | 10/1972 | Stoppard | 83/410 |

FOREIGN PATENT DOCUMENTS 1150323  4/1969  United Kingdom ............... 209/666

Primary Examiner—Frank T. Yost
Assistant Examiner—Hien H. Phan
Attorney, Agent, or Firm—Herbert L. Lerner; Laurence A. Greenberg

[57] ABSTRACT

Bobbin separating unit, including a first charging device, a second charging device downstream of the first charging device in flow direction of the bobbins, a first separating device, and a second separating device downstream of the first separating device, and a device for controlling the bobbin delivery rate of the first charging and separating devices in dependence on the bobbin content of the second charging and separating devices.

10 Claims, 6 Drawing Figures

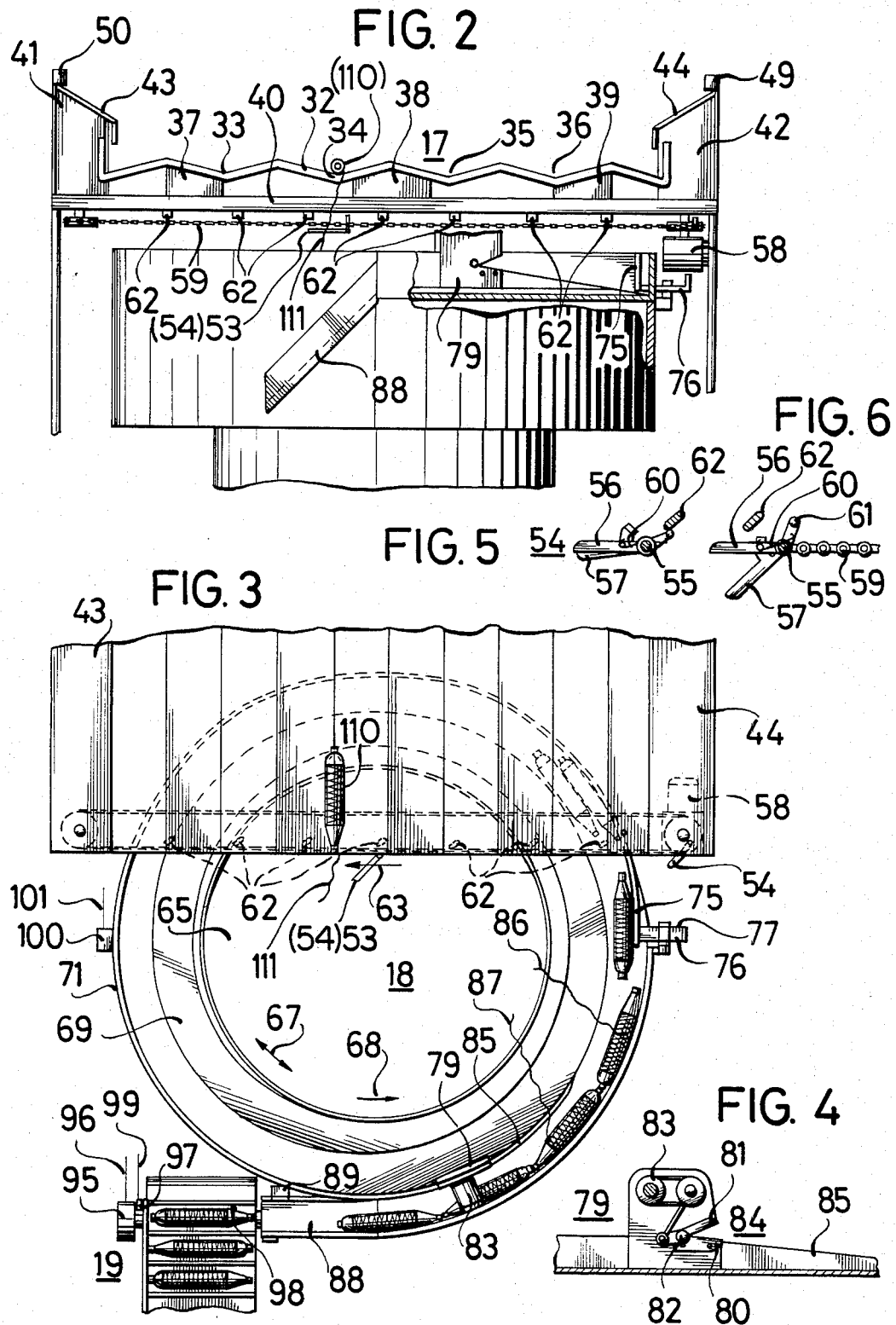

BOBBIN SEPARATING UNIT

The invention relates to a bobbin separating unit with a charging device and a separating device.

Bobbin separating units are used to present individual bobbins which come from a totally random pile to a subsequent device, such as a bobbin preparing station, a bobbin packing device, a tube cleaning device or the like, and to do so sequentially and in rapid sequence.

Such bobbin separating units have the disadvantage that the bobbins travel from the charging device to the separating device very irregularly. In the process, the separating device is overfilled at times, and at other times, too few bobbins enter the separating device. Machine shutdowns due to overfilling and irregular operation of the bobbin separating unit are unavoidable.

Enlarging the separating device for the purpose of preventing it from being overfilled brings other disadvantages. Firstly, the technical and economic costs become greater. Secondly, the disadvantages of the heavy accumulation of randomly piled-up bobbins which rub against each other, cannot be avoided. These are damage to the yarn and to the yarn winding, pulled-on layers of yarn, pushed-together bobbin tubes, damage to tubes, and blocking of and disturbances to machine parts.

It is accordingly an object of the invention to provide a bobbin separating unit, which overcomes the hereinafore-mentioned disadvantages of the heretofore-known devices of this general type, and to insure that while avoiding the above-mentioned disadvantages, the bobbins are separated more rapidly, gently and effectively.

With the foregoing and other objects in view there is provided, in accordance with the invention, a bobbin separating unit, comprising a first charging device, a second charging device downstream of the first charging device in flow direction of the bobbins, a first separating device, and a second separating device downstream of the first separating device, and means for controlling the bobbin delivery of the first charging and separating devices in dependence on the bobbin content of the second charging and separating devices.

In accordance with another feature of the invention, the second charging device is in the form of a flat bulk conveyor, the first separating device is in the form of a rotary bulk conveyor, and the second separating device is in the form of an individual bobbin conveyor.

In accordance with an added feature of the invention, the first separating device is disposed downstream of the second charging device and including a first transfer point disposed therebetween, a second transfer point disposed between the first separating device and the second separating device, and a thread cutter disposed at least at one of the transfer points for severing thread ends which may have been dragged along with the bobbins.

In accordance with an additional feature of the invention, one of the thread cutters is disposed at the first transfer point and includes at least one pair of travelling scissors or a controllable swingable shearing beam.

In accordance with again another feature of the invention, the thread cutter disposed at the first transfer point includes an endless chain disposed on a track in vicinity of the first transfer point, means such as motor being switchable on and off for driving the chain, and stops disposed in vicinity of the chain track, and the travelling scissors include a first blade being fastened to the chain, a second blade having an actuating arm, a rotary joint connecting the blades to each other, and a spring holding the second blade in an open position, the stops being struck by the actuating arm when the chain is running for closing the scissors each time and cutting off any thread which may have been seized by the scissors when open and dragged along.

In accordance with again a further feature of the invention, a thread cutter is disposed at each of the transfer points, the thread cutter disposed at the second transfer point including a pair of scissors having two blades, one of the blades being stationary, a rotary joint connecting the blades, and a motor drive connected to the other of the blades for rhythmically moving the other of the blades to open and close the scissors in continuous sequence, the thread cutter disposed at the first transfer point being activated only when the first separating device is in operation and the second charging device is not in operation.

In accordance with again an added feature of the invention, the second charging device is in the form of a shaker, oscillating or vibrating conveyor including a folded roof-shaped bottom forming a plurality of troughs extended in travel direction of the bobbins, and the first separating device is in the form of a shaker, oscillating or vibrating conveyor having a bottom, an upper edge, a sliding surface rising from the bottom to the upper edge in the form of a three-dimensional spiral being inclined toward the bottom and toward the outside of the conveyor, and a boundary wall separating the sliding surface from the outside.

In accordance with again an additional feature of the invention, the boundary wall has a slit formed therein having a width being larger than the diameter of a bobbin tube and smaller than the diameter of a fully wound bobbin, and an adjustable part of the wall disposed at a given point at an upper end of the sliding surface radially outwardly bounding the sliding surface toward the outside and determining the width of the sliding surface at the given point.

In accordance with a concomitant feature of the invention, there are provided first means for actuating the first charging device, an opto-electric switch of the second charging device for determining the quantity of bulk material in the second charging device and for activating the first actuating means, second means for actuating the second charging device, and another opto-electric switch of the first separating device for determining the quality of bulk material in the first separating device and for activating the second actuating means.

The advantages achieved with the invention are particular that up to the time of actual separation of the bobbins, a settled flow of material is provided which becomes more and more uniform, although the first charging device has a large capacity. The stepwise equalization of the flow of material makes possible effective and fast operation of the bobbin separating unit and especially of the subsequent separating devices.

As mentioned above, a flat bulk conveyor in the form of a conveyor belt is suitable as the second charging device. Even simpler and at least equally as effective is a second charging device which is constructed as an oscillating conveyor. If this second charging device constructed as an oscillating conveyor has a bottom folded in roof-fashion so that a number of shallow troughs are obtained which extend in the travel direction, then it is assured that, for instance, elongated bobbins in the form of spinning cops are oriented in the travel direction and are passed on expeditiously in the process. Due to the new construction, stabilization of the bottom is also achieved. If the first separating device is provided as a rotary bulk conveyor, it is capable of taking on a considerable quantity of bobbins from case to case during a charging operation from the second charging device without overflowing. Only the last separating device is advantageously constructed as an individual bobbin conveyor. The bobbins are only separated with a defined spacing, i.e. practically without a gap, in the last separating device. While the bobbins are already separated in the first separating device, they are not yet separately absolutely without gap.

With the proposed thread cutting devices, disturbances in the bobbin separation due to dragged-along threads and entangled thread ends are avoided. No thread connection remains between the individual devices at the transfer point. At the transfer point between the frist and the second charging devices, no thread severing device is necessary because dragged-along threads can do no damage at this point. The proposed cutting beam resembles a moving beam and can always be swung back under the bottom of the second charging device when it is not in action.

At the transfer point from the second charging device to the first separating device, damage to the bobbins due to the thread cutting device could come about if dropping or piled-up bobbins touch the thread severing device.

To avoid this, the severing device is advantageous in action if the first separating device is in operation and the second charging device is not in operation. Then, no bobbins are recharged, so that dropping bobbins cannot touch the severing device. On the other hand, bobbins that are piled up to the thread severing device, for instance, are required by the motion of the first separation rating device to lie flat and thus come out of contact with the thread severing device. Those dragged-along threads which are not yet severed at this transfer point, or which are formed later in the first separating device, are cut at the end of the first separation device.

As stated hereinafore, it is advantageous to construct the first separating device as a vibrating conveyor and to provide it with a spirally rising sliding surface. The vibration pulses are fed-in in such a way that the bobbins travel up on the spiral sliding surface. If this sliding surface is inclined not only toward the bottom of the separating device but also toward the outside, then the bobbins in their travel can no longer drop back inward to the bottom of the separating device. If the wall located toward the outside in the sliding surface has a slit, the width of which is larger than the diameter of a bobbin tube and smaller than the diameter of a fully wound bobbin, then empty tubes, or not fully wound bobbins, are eliminated when the bobbins travel upward. They fall through the slit into a collecting container, for instance.

In order to prevent the bobbins, such as spinning cops, from traveling to the upper edge side by side, an adjustable wall part determining the width of the sliding surface at this point is advantageously provided at the upper end of the sliding surface in the wall which bounds the sliding surface radially outwardly. The setting of this wall part is accomplished in such a way that a single bobbin can travel on, while a second bobbin lying side by side must drop inward. If the second charging device is provided as a vibrating conveyor, it is advisable to connect the first charging device to the second charging device in a manner that transmits the vibrations well. The vibrations of the second charging device can thus be transmitted to the first charging device and can attenuate and equalize the charging operations of the latter.

That device, the content of which is to control the delivery rate of the preceding device, is advantageously equipped with an opto-electric switch which has a functional connection to an actuating element of the preceding device. Opto-electric switches work without contacts and therefore preclude damage to the bobbins.

Other features which are considered as characteristic for the invention are set forth in the amended claims.

Although the invention is illustrated and described herein as embodied in a bobbin separating unit, it is nevertheless not intended to be limited to the details shown, since various modifications and structural changes may be made therein without departing from the spirit of the invention and within the scope and range of equivalents of the claim.

The construction and method of operation of the invention, however, together with additional objects and advantages thereof will be best understood from the following description of specific embodiments when read in connection with the accompanying drawings, in which:

FIG. 2 is a fragmentary front elevational view of the second charging device and the first separating device; the first separating device being partially broken away;

FIG. 3 is a fragmentary top plan view of the second charging device and the first and the second separating device; and FIG. 4 is a fragmentary partially cross-sectional view, and FIGS. 5 and 6 are elevational views, each showing further details of the device.

Figure 1:
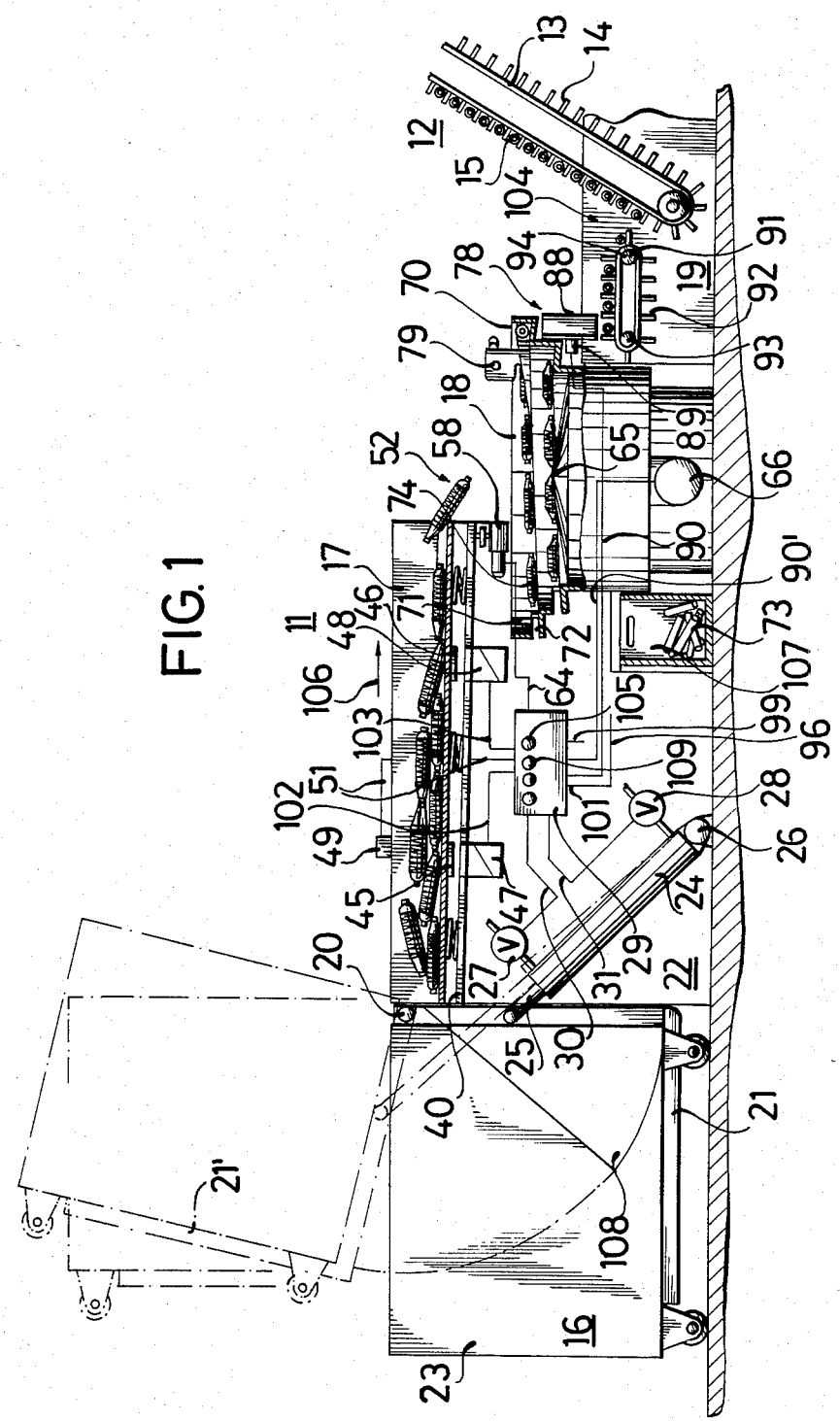
FIG. 1 is a fragmentary, disgrammatic, side elevational view of the invention.

Referring now to the figures of the drawing and first particularly to FIG. 1 thereof, it is seen that the bobbin separating unit which is designated overall with reference numeral 11, is followed by a bobbin conveyor 12 which includes a conveyor belt 13 with ribs 14. The ribs 14 are spaced from each other far enough so that they form compartments, being capable of receiving one bobbin, in this case a spinning cop 15.

A first charging device 16 shown in the drawings is followed by a second charging device 17. This is followed by a first separating device 18 which in turn is followed by a second separating device 19. The bobbin delivery rate of the device can always be controlled by the bobbin content of the following device.

The first charging device 16 includes an angular frame 21 which can be swung about a fulcrum 20 thereof and which can be brought into a position 21' by means of a hydraulic actuating device 22. A cart 23 filled with spinning cops can be rolled over the lower part of the angular frame 21 and locked to the angular frame. A controlled hydraulic cylinder 24 of the actuating device 22 carries out an upward swinging of the angular frame 21 and a pouring out of the contents of the cart 23 by extending a piston rod 25 which is flexibly linked to the angular frame 21, while the hydraulic cylinder 24 is swung about an axis 26. For this purpose, two hydraulic control valves 27 and 28 are provided. These valves can be addressed from a control box 29 through lines 30, 31. The control valves are connected to a hydraulic system, which is not shown in detail. The control box 29 contains all of the switches and connecting devices for the activities to be described hereinbelow.

The second charging device 17 is constructed as a flat bulk conveyor. In the drawings of FIGS. 1 and 2, there is seen in particular a bottom 32 which is folded in the shape of a roof in such a manner that shallow troughs 33 and 36 are formed. Spring elements 37, 38, 39 connect the bottom 32 to a base plate 40. Metal sheets 41, 42 standing on the base plate 40 support inclined side walls 43, 44. The bottom 32 carries iron armatures 45, 46 of the underside thereof. Two vibrators 47, 48 which are inserted into the base plate 40 act on the armatures 45, 46. The vibrators 47, 48 are connected by electric lines 102, 103 to the control box 29. For measuring the bobbin content, the second charging device 17 has a reflection light gate including an opto-electric switch 49 and a reflector 50, shown in FIG. 2. Through an electric line 51, the control box 29, the lines 30, 31 and the hydraulic control valves 27, 28, a functional connection exists from the opto-electric switch 49 to the actuating device 22 of the first charging device 16.

At the transfer point 52 from the second charging device 17 to the first separating device 18, there is disposed a thread cutter 53 for severing thread ends which may be dragged along before they become tangled with thread ends of neighboring coils. The thread cutter 53 has several travelling scissors 54 which are shown in particular in FIGS. 5 and 6. Each pair of travelling scissors has two scissors blades 56, 57 joined together by a rotary joint 55. The scissor blade 56 is fastened to an endless chain 59 which can be moved by a motor drive 58 that can be switched on and off. The other scissor blade 57 is held in the open position by a spring 60, as shown in FIG. 6. The scissor blade 57 has an actuating arm 61 which strikes stops 62 if the endless chain 59 is running. The stops 62 are disposed on the base plate 40 in the vicinity of the chain track, the traveling scissors 54 being closed each time. A thread which is dragged along and may have been seized previously by the open travelling scissors, is then cut off. An arrow 63 in FIG. 3 indicates the direction of motion of the endles chain 59. The motor drive 58 is connected to the control box 29 by an electric line 64.

The first separating device 18 is constructed as a rotary bulk conveyor. It is seen particularly in FIGS. 1 and 3 that this rotary bulk conveyor has a conical bottom 65 which causes the spinning cops poured onto the bottom to slide or roll toward the edge. A vibrator 66 makes the separating device 18 vibrate in the direction of the curved double arrow 67, the motion in the direction of the arrow 68 always being faster than the motion in the opposite direction. As a consequence, spinning cops located at the edge of the bottom 65 travel up on a sliding surface 69. The sliding surface 69 rises from the bottom 65 to an upper edge 70 of the first separating device 18 in the form of a three dimensional spiral. The drawings show that the sliding surface 69 is also inclined toward the outside. The sliding surface 69 only has a likewise spirally rising boundary wall 71 at the outside. On the inside, bobbins which lie crosswise or run onto each other, can advantageously drop back inward into the bobbin supply. The wall 71 has a slit 72 formed at one point thereof, the width of which is larger than the diameter of a bobbin tube 73 and smaller than the diameter of a fully wound spinning cop 74. At the upper end of the sliding surface 69, an adjustable wall part 75 is provided in the wall 71 which forms a boundary of the sliding surface 69 radially outwardly, and determines the width of the sliding surface 69 at this point. The setting of the wall part 75 is accomplished by a strap 76 which carries a scale 77 on which the effective width of the sliding surface can be read.

FIG. 3 shows clearly that only individual bobbins can pass the wall part 75. Two bobbins lying side by side cannot pass the wall part 75. The second bobbin is rejected and drops to a lower part of the sliding surface 69 or back into the bobbin supply.

At the transfer point 78 from the first separating device 18 to the second separating device 19, there is disposed a thread cutter 79 for cutting off thread ends that may have been dragged along. The drawings of FIGS. 3 and 4 show that the thread cutter 79 has scissors 84 with two scissor blades 80, 81, which are connected together by a rotary joint 82. The scissor blade 80 is stationary. The other scissor blade 81 is moved rhythmically by means of a motor drive 83 in such a way that the scissors open and close in continuous sequence. A baffle 85 rising in the shape of a wedge makes certain that the dragged-along threads 86, 87 are guided toward the thread cutter 79.

At the transfer point 78 there is seen a chute 88 which is monitored by an opto-electric switch 89. The opto-electric switch 89 is connected to the control box 29 by a line 90. Every time a bobbin slides down the chute 88, the vibrator 66 connected to the control box 29 by a line 90' is switched off.

The separating device 19 includes an endless conveyor belt 91 which has ribs 92 fastened thereon, and runs over belt rolls 93, 94. The belt roll 93 is driven by a motor drive 95. The motor drive 95 is connected to the control box 29 by a line 96. An opto-electric switch 97 monitors the contents of the bobbin compartment 98 lying just in front of the chute 88 of the separating device 19. The opto-electric switch 97 is connected by a line 99 to the control box 29 and always causes the vibrator 66 to be switched on if the bobbin compartment 98 is empty.

The first separating device 18 has an opto-electric switch 100 which ascertains the presence of bulk material, i.e. the quantity of charged-in coils, and is connected to the control box 29 by a line 101. The opto-electric switch 100 works according to the principle of a reflection light gate, which switches on the vibrators 47 and 48 if the filling level falls below a predetermined value, and switches them off again if the predetermined filling level is exceeded. Switching delays become effective in this process in order to prevent the above-mentioned switching cycles from following each other too quickly.

Due to the fact that the center of rotation or fulcrum 20 of the first charging device 16 is in connection with the base plate 40, the first charging device 16 is connected to the second charging device 17 in a manner which effectively passes on vibrations. If the bottom 32 of the second charging device 17 vibrates, then the first charging device 16 also vibrates to a lesser extent.

The conveyor belt 91 of the separating device 19 operates in cycles. A brief motion is always followed by a somewhat longer shutdown. The forward movement of the conveyor belt 13 is tuned to the motion of the conveyor belt 91. During the moving phase of the two conveyor belts, a separated spinning cop is transferred at the transfer point 104. During the standstill phase of the conveyor belt 91, a spinning cop is transferred from the first separating device 18 by means of the chute 88. The conveyor belt 91 remains stopped until the transfer is accomplished.

The device operates as follows:

At first, no bobbins are contained in the charging devices nor in the separating devices. To prepare for the bobbin separation, a filled cart 23 is pushed over the lower part of the angular frame 21 and is locked. If the switch 105 is now switched on at the control box 29, the bobbin separating unit 11 begins to operate.

The two conveyor belts 13 and 91 cannot start as yet because the opto-electric switch 97 has not yet ascertained the presence of a bobbin in the bobbin compartment 98. The opto-electric switch 97 therefore switches on the vibrator 66 in order to effect the transfer of a bobbin from the first separating device 18. However, no bobbins are initially present there. There is also ascertained by theopto-electric switch 100 which for this reason switches on the two vibrators 47 and 48. However, no bobbins are present as yet in the second charging device 17 as well. This is ascertained by the opto-electric switch 49 which, for this reason, switches on the hydraulic actuating device 22 by opening the hydraulic control valve 28. The actuating device 22 swings the angular frame 21 up and thereby places the cart 23 in a tilted position. The spinning cops then begin to slide out of the cart 23 onto the bottom 32 of the second charging device 17.

The cart 23 is tilted until the opto-electric switch 49 ascertains that a quantity of bobbins of predetermined height lies on the bottom 32. This causes the hydraulic control valve 28 to be closed. The cart 23 then remains in its tilted position. Through the transmitted vibrations of the second charging device 17, bobbins further slide from the cart 23 into the charging device 17 in decreasing numbers.

Since the charging device 17 is constructed as a flat bulk conveyor, the bobbins are transported in the direction of the arrow 106 and fall individually or in smaller groups into the first separating device 18.

The bobbin separating operation proper now begins. The bobbins, i.e. the spinning cops in this case, slide sequentially upward on the sliding surface 69, while more and more cops are filled into the separating device 18.

Finally, the opto-electric switch determines a maximum height of filled-in bobbins. The opto-electric switch 100 thereupon switches the two vibrators 47 and 48 off again. The transfer of the bobbins from the second charging device into the first separating device ceases therewith. If the first separating device 18 is still operating, the motor drive 58 of the thread cutter 53 is switched on at the same time. The travelling scissors 54 of the thread cutter 53 then travel in the direction of the arrow 63, while they are continuously opened and closed because the actuating arms 61 strike the stops 62. Thread ends that may have been dragged along are then cut. If, however, the first separating device 18 is also stopped, then the thread cutter 53 is not set in operation or switched off. This is done because the seizure of bobbins that may be piled high toward the endless chain 59 by the travelling scissors 54 which could damage them, is to be avoided. The thread cutter 53 is therefore locked by the switch contained in the control box 29 for the first separating device 18.

In the meantime, the first bobbins have also arrived at the upper edge of the separating device 18. During their travel along the sliding surface 69, insufficiently wound bobbins and bobbin tubes have dropped through the slit 72 into a box 107.

The motor drive 83 of the thread cutter 79 is simultaneously switched on and off each time with the vibrator 66. Therefore, as long as the spinning cops are transported onward, the thread cutter 79 assures that threads 86, 87 that have been dragged along are continuously cut off.

As soon as the first bobbin slides over the chute 88, this is ascertained by the opto-electric switch 89 which then simultaneously switches off the vibrator 66 and the thread cutter 79.

When the angular frame 21 is swung up, cover sheets 108, which are pushed together like a fan, are spread out and lifted, so that a protective wall is automatically provided which is to prevent accident-provoking manipulation under the tilting region.

Gradually, the cart 23 is brought into its maximally tilted position, which goes beyond the tilted position 21' and is not shown in FIG. 1. As soon as the maximally tilted position is reached, the angular frame 21 returns to the starting position after a delay. The capacity of the charging device 17 is so large that sufficient time remains to exchange the empty cart 23 for a full cart. During the exchange, there is the possibility of blocking the actuating device 22 by a switch 109. As soon as the blocking is cancelled after the exchange of carts, the activity cycle described herein begins anew.

The bobbins are not always transported upward on the sliding surface 69 as closely spaced apart as is shown in FIG. 3. As a rule, there are different spacings between the individual bobbins. It is only in the following separating device 19 that the bobbins then lie side by side at a defined spacing, i.e. without a gap. The delivery from the separating device 19 need not be absolutely made on the bobbin conveyor 12. Depending on the requirements, the bobbins can also be deposited in wells, crates, on a flat conveyor, or the like. However, they can also be delivered to a bobbin aligning machine which then passes on the bobbins after being sorted with regard to their tips.

There are claimed:

1. Bobbin separating unit, comprising a first charging device, a second charging device downstream of said first charging device in flow direction of the bobbins, a first separating device and a second separating device downstream of said first separating device, and means for controlling the bobbin delivery rate of said first charging and separating devices in dependence on the bobbin content of said second charging and separating devices, said second charging device being in the form of a flat bulk conveyor, said first separating device being in the form of a rotary bulk conveyor, and said second separating device being in the form of an individual bobbin conveyor.

2. Bobbin separating unit according to claim 1, wherein said first separating device is disposed downstream of said second charging device and including a first transfer point disposed therebetween, a second transfer point disposed between said first separating device and said second separating device, and a thread cutter disposed at least at one of said transfer points for severing thread ends which may have been dragged along with the bobbins.

3. Bobbin separating unit according to claim 2, wherein said thread cutter is disposed at said first transfer point and includes at least one pair of travelling scissors.

4. Bobbin separating unit according to claim 3, wherein said thread cutter disposed at said first transfer point includes an endless chain disposed on a track in vicinity of said first transfer point, means being switchable on and off for driving said chain, and stops disposed in vicinity of said chain track, and said travelling scissors include a first blade being fastened to said chain, a second blade having an actuating arm, a rotary joint connecting said blades to each other, and a spring holding said second blade in an open position, said stops being struck by said actuating arm when said chain is running for closing said scissors each time and cutting off any thread which may have been seized by said scissors when open and dragged along.

5. Bobbin separating unit according to claim 4, wherein another of said thread cutters is disposed at said second transfer point, said thread cutter disposed at said second transfer point including a pair of scissors having two blades, one of said blades being stationary, a rotary joint connecting said blades, and a motor drive connected to the other of said blades for rhythmically moving the other of said blades to open and close said scissors in continuous sequence, said thread cutter disposed at said first transfer point being activated when said first separating device is in operation and said second charging device is not in operation.

6. Bobbin separating unit according to claim 2, wherein a thread cutter is disposed at each of said transfer points, said thread cutter disposed at said second transfer point including a pair of scissors having two blades, one of said blades being stationary, a rotary joint connecting said blades, and a motor drive connected to the other of said blades for rhythmically moving the other of said blades to open and close said scissors in continuous sequence, said thread cutter disposed at said first transfer point being activated when said first separating device is in operation and said second charging device is not in operation.

7. Bobbin separating unit according to claim 1, including means for spacing the bobbins apart from each other while in said separating devices.

8. Bobbin separating unit, comprising a first charging device, a second charging device downstream of said first charging device in flow direction of the bobbins, a first separating device and a second separating device downstream of said first separating device, and means for controlling the bobbin delivery rate of said first charging and separating devices in dependence on the bobbin content of said second charging and separating devices, said second charging device being in the form of an oscillating conveyor including a folded roof-shaped bottom forming a plurality of troughs extended in travel direction of the bobbins, and said first separating device being in the form of an oscillating conveyor having a bottom, an upper edge, a sliding surface rising from said bottom to said upper edge in the form of a three-dimensional spiral being inclined toward said bottom and toward the outside of said conveyor, and a boundary wall separating said sliding surface from the outside.

9. Bobbin separating unit according to claim 8, wherein said boundary wall has a slit formed therein having a width being larger than the diameter of a bobbin tube and smaller than the diameter of a fully wound bobbin, and an adjustable part of said wall disposed at a given point at an upper end of said sliding surface radially outwardly bounding said sliding surface toward the outside and determining the width of said sliding surface at said given point.

10. Bobbin separating unit, comprising a first charging device, a second charging device downstream of said first charging device in flow direction of the bobbins, a first separating device and a second separating device downstream of said first separating device, means for controlling the bobbin delivery rate of said first charging and separating devices in dependence on the bobbin content of said second charging and separating devices, first means connected to said first charging device for actuating said first charging device, an opto-electric switch in vincinity of said second charging device for determining the quantity of bulk material in said second charging device, said opto-electric switch being connected to said first actuating means for activating said first actuating means, second means connected to said second charging device for actuating said second charging device, and another opto-electric switch in vicinity of said first separating device for determining the quantity of bulk material in said first separating device, said other opto-electric switch being connected to said second actuating means for activating said second actuating means.

* * * * *